(12) United States Patent
Tanaka et al.

(10) Patent No.: US 12,500,748 B2
(45) Date of Patent: *Dec. 16, 2025

(54) FORWARDING DEVICE, KEY MANAGEMENT SERVER DEVICE, COMMUNICATION SYSTEM, FORWARDING METHOD, AND COMPUTER PROGRAM PRODUCT

(71) Applicant: KABUSHIKI KAISHA TOSHIBA, Tokyo (JP)

(72) Inventors: Yasuyuki Tanaka, Kawaasaki Kanagawa (JP); Takahiro Yamaura, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,878

(22) Filed: Aug. 30, 2021

(65) Prior Publication Data

US 2022/0150058 A1 May 12, 2022

(30) Foreign Application Priority Data

Nov. 6, 2020 (JP) ................................. 2020-185822

(51) Int. Cl.
*H04L 9/08* (2006.01)
(52) U.S. Cl.
CPC .......... *H04L 9/0852* (2013.01); *H04L 9/0825* (2013.01); *H04L 9/0861* (2013.01)
(58) Field of Classification Search
CPC ... H04L 9/0852; H04L 9/0825; H04L 9/0861; H04L 63/0464
See application file for complete search history.

(56) References Cited

U.S. PATENT DOCUMENTS

| 2009/0113203 A1 | 4/2009 | Tsuge et al. |
| 2014/0013101 A1 | 1/2014 | Tanizawa et al. |
| 2016/0219024 A1* | 7/2016 | Verzun ...................... H04L 9/34 |

(Continued)

FOREIGN PATENT DOCUMENTS

| CN | 103916239 A | 7/2014 | |
| CN | 112100473 A | * 12/2020 | ........... G06F 16/951 |

(Continued)

OTHER PUBLICATIONS

ETSI, "Quantum Key Distribution (QKD); Protocol and data format of REST-based key delivery API (ETSI GS QKD 014 V1.1.1 (Feb. 2019)," 22 pages (2019).

(Continued)

*Primary Examiner* — Alexander Lagor
*Assistant Examiner* — Lydia L Noel
(74) *Attorney, Agent, or Firm* — Finnegan, Henderson, Farabow, Garrett & Dunner, LLP

(57) ABSTRACT

According to an embodiment, a forwarding device, which is connected to a key management server device configured to generate a decryption key by using quantum key distribution, includes a memory and one or more processors coupled to the memory. The one or more processors are configured to: receive a reception packet; decrypt the reception packet when the reception packet is a decryption target packet; and forward the decrypted reception packet or the undecrypted reception packet.

1 Claim, 12 Drawing Sheets

(56) References Cited

U.S. PATENT DOCUMENTS

| | | | |
|---|---|---|---|
| 2016/0233964 A1 | 8/2016 | Frohlich et al. | |
| 2017/0324714 A1* | 11/2017 | Wainner | H04L 63/0892 |
| 2018/0019878 A1* | 1/2018 | Jiang | H04L 63/08 |
| 2018/0054304 A1 | 2/2018 | Tanizawa | |
| 2019/0149327 A1* | 5/2019 | Yuan | H04L 9/0852 |
| | | | 380/255 |
| 2019/0260581 A1* | 8/2019 | Su | H04L 9/0855 |
| 2021/0306146 A1 | 9/2021 | Chen | |
| 2022/0029797 A1 | 1/2022 | Tanaka et al. | |
| 2022/0150059 A1 | 5/2022 | Tanaka et al. | |
| 2023/0384154 A1* | 11/2023 | Lee | H04L 9/0852 |

FOREIGN PATENT DOCUMENTS

| | | |
|---|---|---|
| JP | 2006-33350 A | 2/2006 |
| JP | 2007-267064 A | 10/2007 |
| JP | 2009-111437 A | 5/2009 |
| JP | 2009-182427 A | 8/2009 |
| JP | 2014-17595 A | 1/2014 |
| JP | 2016-144206 A | 8/2016 |
| JP | 2018-29302 A | 2/2018 |
| JP | 2018-512099 A | 5/2018 |
| JP | 2022-21818 A | 2/2022 |
| KR | 1020200132506 * | 10/2020 |

OTHER PUBLICATIONS

Japan Patent Office, Decision to Grant a Patent in JP App. No. 2020-185822, 1 page, with machine translation, 2 pages (Jan. 28, 2025).

* cited by examiner

US 12,500,748 B2

FORWARDING DEVICE, KEY MANAGEMENT SERVER DEVICE, COMMUNICATION SYSTEM, FORWARDING METHOD, AND COMPUTER PROGRAM PRODUCT

CROSS-REFERENCE TO RELATED APPLICATIONS

This application is based upon and claims the benefit of priority from Japanese Patent Application No. 2021-185822, filed on Nov. 6, 2020; the entire contents of which are incorporated herein by reference.

FIELD

Embodiments described herein relate generally to a forwarding device, a key management server device, a communication system, a forwarding method, and a computer program product.

BACKGROUND

An application programming interface (API) is used in acquiring encryption keys/decryption keys generated from key management server devices by using quantum key distribution (QKD). When receiving a one-time encrypted packet, a forwarding device (or a host) such as a router acquires a decryption key from a key management server device by using the API and decrypts the packet.

However, in the conventional techniques described above, it is difficult to perform QKD encryption and decryption without degrading the communication performance of a wide-area IP network.

DETAILED DESCRIPTION

According to an embodiment, a forwarding device, which is connected to a key management server device configured to generate a decryption key by using quantum key distribution, includes a memory and one or more processors coupled to the memory. The one or more processors are configured to: receive a reception packet; decrypt the reception packet when the reception packet is a decryption target packet; and forward the decrypted reception packet or the undecrypted reception packet.

Hereinafter, embodiments of a forwarding device, a key management server device, a communication system, a forwarding method, and a computer program product will be described in detail with reference to the accompanying drawings.

Note that a packet indicates a transmission unit of information transmitted and received via a network, and frames at L2, and segments and datagrams at L4 are also referred to as packets for the sake of convenience in the description of the following embodiments. Those referred to as packets include information such as headers and footers at L2.

First Embodiment

Figure 1:
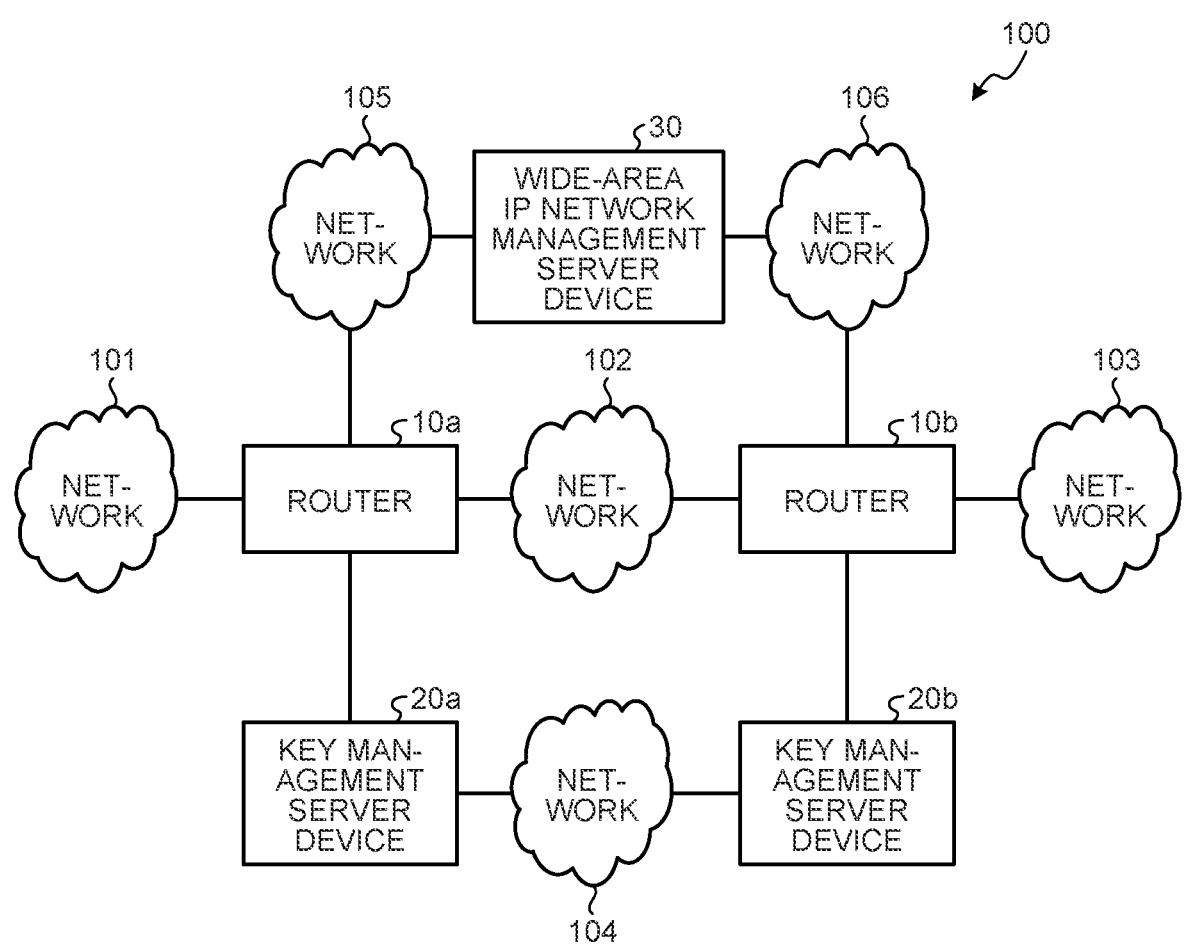
FIG. 1 is a diagram illustrating a system configuration example of a communication system according to a first embodiment.

First, a system configuration example of a communication system of a first embodiment will be described.
System Configuration Example FIG. 1 is a diagram illustrating a system configuration example of a communication system 100 according to the first embodiment. The communication system 100 of the first embodiment includes routers 10a and 10b, key management server devices 20a and 20b, a wide-area IP network management server device 30, and networks 101 to 106.

Hereinafter, the routers 10a and 10b will be simply referred to as a router 10 when not distinguished from each other. Similarly, the key management server devices 20a and 20b will be simply referred to as a key management server device 20 when not distinguished from each other.

The routers 10a and 10b are connected together via the network 102. The network 102 is, for example, a wide area network such as the Internet.

The router 10a is also connected to the network 101 so as to forward a packet received through the network 101 to the router 10b. The router 10b is also connected to the network 103 so as to forward the packet forwarded from the router 10a to an external device connected to the network 103.

The router 10a is connected to the key management server device 20a. The router 10b is connected to the key management server device 20b. The router 10a acquires an encryption key for encrypting the packet to be forwarded to the router 10b from the key management server device 20a. Meanwhile, the router 10b acquires a decryption key for decrypting the packet received from the router 10a from the key management server device 20b.

Although the embodiments describe packet encryption and decryption processes for the sake of convenience, the packet encryption and decryption processes do not necessarily have to be performed. In some applications, the router 10a may attach authentication data to the packet without encrypting the packet, and the router 10b may verify the authentication data. In any case, the router 10a acquires a key from the key management server device 20a along with the packet forwarding process, and the router 10b acquires a key corresponding to the key used in the router 10a from the key management server device 20b.

Note that the router 10 and the key management server device 20 may be mounted in the same housing as one device, or may be mounted as separate devices.

The key management server devices 20a and 20b are connected together via the network 104. The networks 102 and 104 may be an identical network or different networks. Typically, the key management server devices 20a and 20b are connected to each other via an optical fiber network. Thus, the key management server devices 20a and 20b can safely share a bit string with each other by quantum cryptography. In addition to sharing the bit string, the key management server devices 20a and 20b transmit and receive a control message for generating/sharing the decryption key corresponding to the encryption key. For example, a key identifier for identifying each key, and a length of key (key length) are adjusted by the control message. Information included in the control message is referred to as key information. Meanwhile, a bit string indicating the encryption key and the decryption key itself is referred to as a key value.

The wide-area IP network management server device 30 is connected to the router 10a via the network 105. The wide-area IP network management server device 30 transmits information specifying a packet to be encrypted to the router 10a. The wide-area IP network management server device 30 is also connected to the router 10b via the network 106. The wide-area IP network management server device 30 transmits information specifying a packet to be decrypted to the router 10b.

Note that the networks 102, 105, and 106 may be an identical network or different networks from one another. Alternatively, some of the networks 102, 105, and 106 may be an identical network, and the remaining network may be a different network therefrom.

The packets to be encrypted and decrypted are specified based on, for instance, a source MAC address, a destination MAC address, a source IP address, a destination IP address, a protocol, and a priority of the packet.

For example, when the target is a TCP packet and a UDP packet, the wide-area IP network management server device 30 identifies the packet to be encrypted or decrypted by using a source port number, a destination port number or the like. For example, when the target is an ICMP packet, the wide-area IP network management server device 30 identifies the packet to be encrypted or decrypted by using an ICMP type and code or the like.

The protocol can be identified by using, for instance, an EtherType field of an Ethernet (registered trademark) frame, a PID of a Subnetwork Access Protocol (SNAP) included in a frame, and a Protocol field of an IP header. For example, when IPv4 is used, a value of a Type of Service (TOS) field can be used as the priority. For example, when IPv6 is used, a value of a Traffic Class field can be used as the priority. In any case, the wide-area IP network management server device 30 uniquely specifies a series of packets transmitted and received between specific nodes or specific applications, instructs the router 10a to encrypt the specified packets (flows), and instructs the router 10b to decrypt the specified packets (flows). Note that the target of encryption or decryption specified by the wide-area IP network management server device 30 may be one packet as well as a plurality of packets (flows).

The wide-area IP network management server device 30 can further specify a flow not to be encrypted for the router 10a, and a flow not to be decrypted for the router 10b.

The router 10a may obtain information such as a Secure Application Entity (SAE) ID of the router 10b together with the instruction from the wide-area IP network management server device 30, or may identify the SAE ID of the router 10b based on the instruction.

To instruct the router 10a from the wide-area IP network management server device 30, protocols such as SNMP, NETCONF, and SIP may be used, or an original communication protocol may be used. Additionally, for example, the wide-area IP network management server device 30 and the router 10a may share a file and a memory, through which the wide-area IP network management server device 30 may give the instruction to the router 10a. The same applies to the instruction to the router 10b from the wide-area IP network management server device 30.

Function Configuration Example of Packet Encrypting Router

Figure 2:
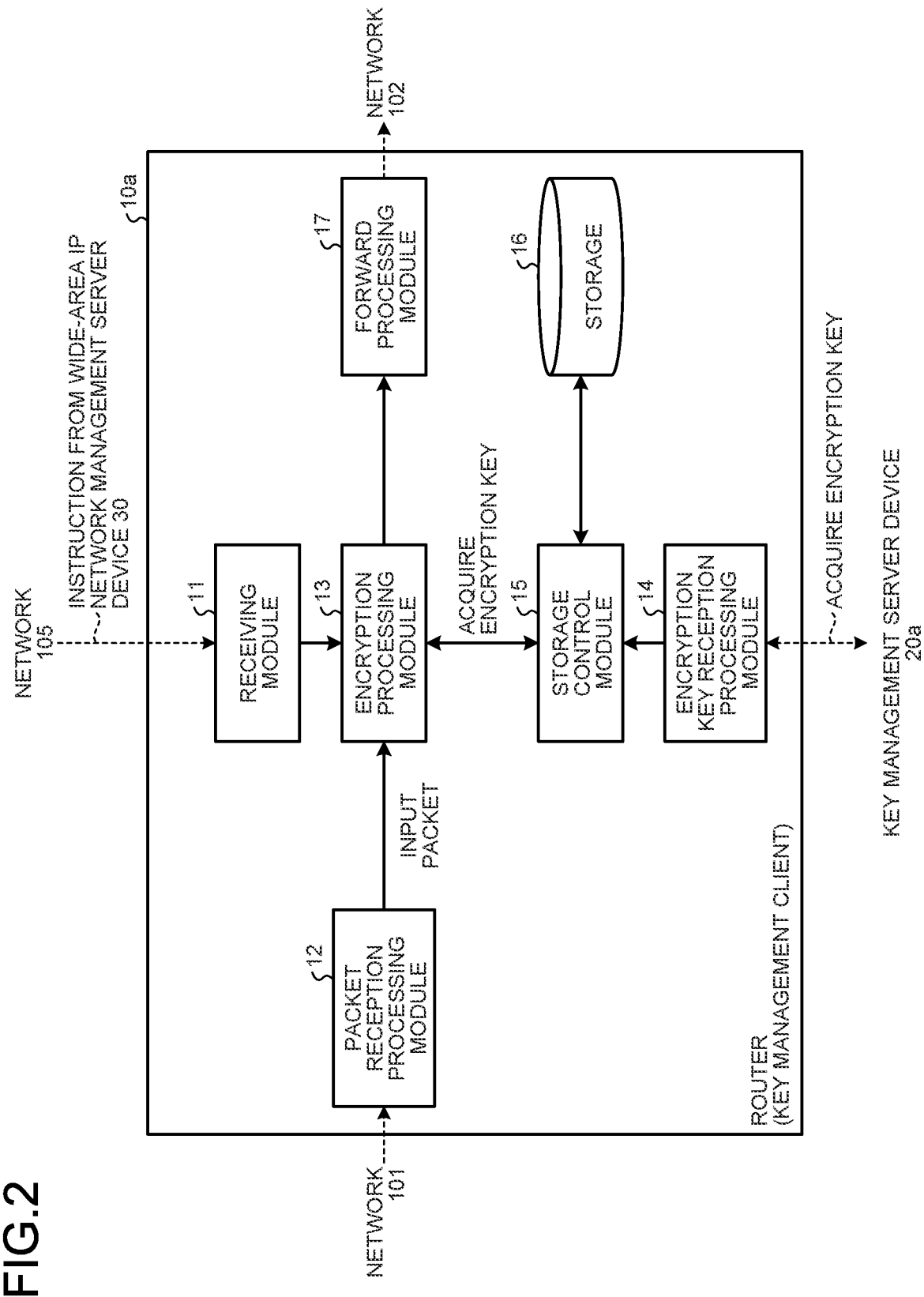
FIG. 2 is a diagram illustrating a function configuration example of a router that encrypts a packet according to the first embodiment.

FIG. 2 is a diagram illustrating a function configuration example of the router 10a that encrypts a packet according to the first embodiment. The router 10a of the first embodiment includes a receiving module 11, a packet reception processing module 12, an encryption processing module 13, an encryption key reception processing module 14, a storage control module 15, a storage 16, and a forward processing module 17.

The receiving module 11 receives, for example, information specifying a packet to be encrypted (encryption target packet) from the wide-area IP network management server device 30. The receiving module 11 also receives, for example, information specifying a packet not to be encrypted from the wide-area IP network management server device 30. When receiving the instruction from the wide-area IP network management server device 30, the receiving module 11 informs the encryption processing module 13 whether to encrypt the instructed packet.

When receiving a packet from the network 101, the packet reception processing module 12 inputs the packet to the encryption processing module 13.

When the received packet is instructed to be encrypted by the wide-area IP network management server device 30, the encryption processing module 13 inputs a request to read an encryption key having a specified key length to the storage control module 15, and acquires the encryption key from the storage control module 15. The encryption processing module 13 then encrypts the packet, and inputs the encrypted packet to the forward processing module 17. Meanwhile, when the received packet is instructed not to be encrypted by the wide-area IP network management server device 30, the encryption processing module 13 inputs the packet to the forward processing module 17 without giving the encryption process.

When receiving an encryption key from the key management server device 20a, the encryption key reception processing module 14 inputs the encryption key to the storage control module 15.

When receiving the encryption key from the encryption key reception processing module 14, the storage control module 15 stores the encryption key in the storage 16. Additionally, when receiving a request to read the encryption key having a specified key length from the encryption processing module 13, the storage control module 15 reads the encryption key having the specified key length from the storage 16, and inputs the encryption key and the key identifier identifying the encryption key to the encryption processing module 13.

Note that the storage control module 15 may keep acquiring the encryption key from the key management server device 20a via the encryption key reception processing module 14 independently of the operation of the encryption processing module 13. Alternatively, the storage control module 15 may acquire the encryption key from the key management server device 20a via the encryption key reception processing module 14 when instructed by the encryption processing module 13.

The encryption key is acquired, for example, by using a communication protocol such as ETSI GS QKD 014. The encryption key may be also acquired, for example, via a key file generated by the key management server device 20a. Additionally, the encryption key may be acquired, for example, through a shared memory when the router 10a and the key management server device 20a are mounted in the same housing as one device.

When receiving the encrypted packet or the unencrypted packet from the encryption processing module 13, the forward processing module 17 forwards the packet to the router 10b through the network 102.

Function Configuration Example of Packet Decrypting Router

Figure 3:
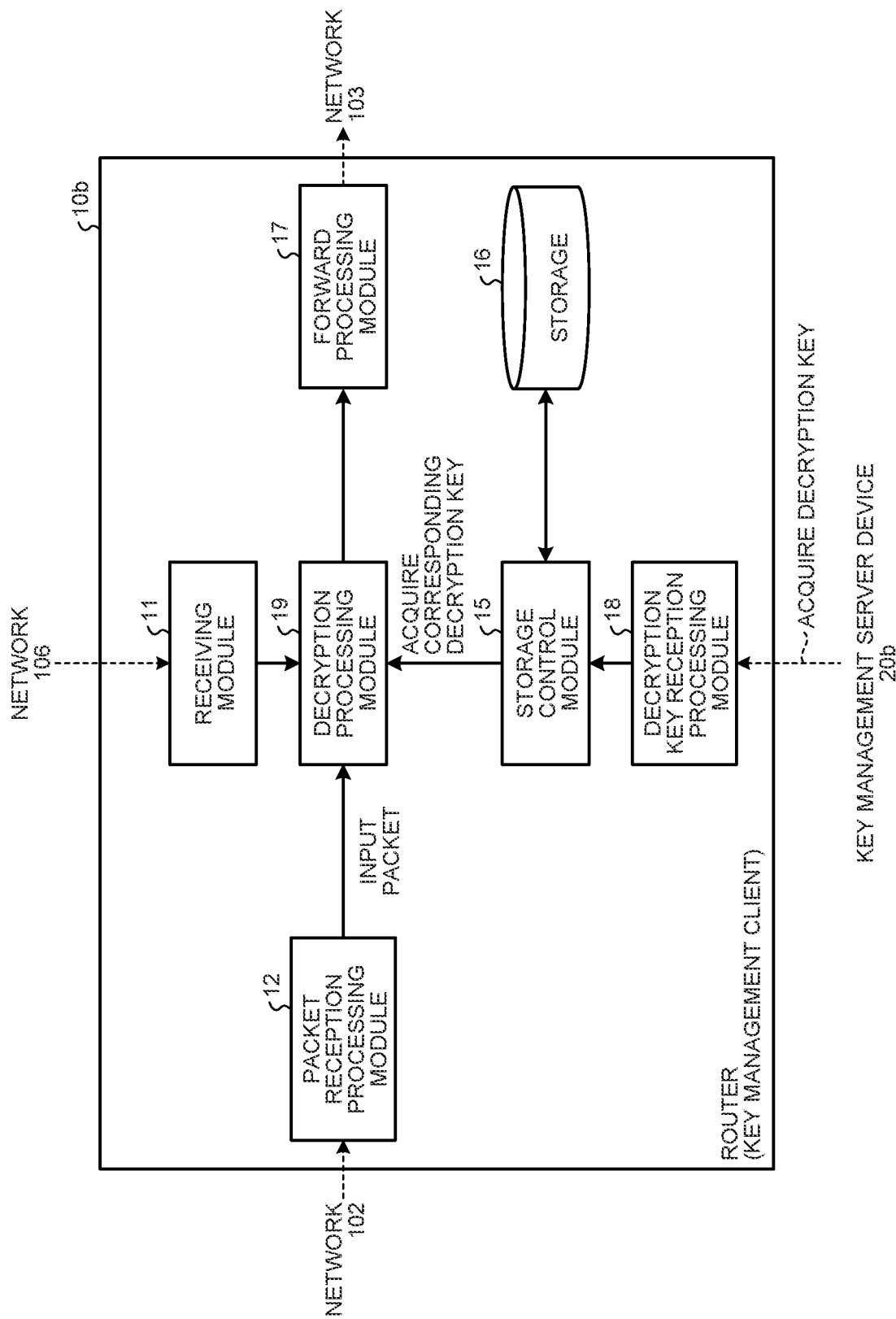
FIG. 3 is a diagram illustrating a function configuration example of a router that decrypts a packet according to the first embodiment.

FIG. 3 is a diagram illustrating a function configuration example of the router 10b that decrypts a packet according to the first embodiment. The router 10b basically performs a similar operation to that of the router 10a. The routers 10a and 10b differ in processing performed on the packet. While the router 10a performs encryption, the router 10b performs decryption. The router 10b of the first embodiment includes the receiving module 11, the packet reception processing module 12, the storage control module 15, the storage 16, the forward processing module 17, a decryption key reception processing module 18, and a decryption processing module 19.

A packet header includes the presence/absence of encryption. In the presence of encryption, the packet header includes a key identifier and an encryption algorithm of a key used for encryption. When a payload is only partially encrypted, the packet header includes information identifying the encrypted region.

The receiving module 11 receives, for example, information specifying a packet to be decrypted (decryption target packet) from the wide-area IP network management server device 30. The receiving module 11 also receives, for example, information specifying a packet not to be decrypted from the wide-area IP network management server device 30. When receiving the instruction from the wide-area IP network management server device 30, the receiving module 11 informs the decryption processing module 19 whether to decrypt the instructed packet.

When receiving the packet from the network 102, the packet reception processing module 12 inputs the packet to the decryption processing module 19.

Meanwhile, the decryption key reception processing module 18 acquires a decryption key from the key management server device 20b independently of the packet reception process. When receiving the decryption key from the key management server device 20b, the decryption key reception processing module 18 inputs the decryption key to the storage control module 15.

The decryption key is acquired, for example, by using a communication protocol such as ETSI GS QKD 014. The decryption key may be also acquired, for example, via a key file generated by the key management server device 20b. Additionally, the decryption key may be acquired, for example, through a shared memory when the router 10b and the key management server device 20b are mounted in the same housing as one device.

When receiving the decryption key from the decryption key reception processing module 18, the storage control module 15 stores the decryption key in the storage 16. The storage 16 accumulates decryption keys independently of the packet reception process. When receiving a request to read the decryption key from the decryption processing module 19, the storage control module 15 reads the decryption key from the storage 16, and inputs the decryption key to the decryption processing module 19.

Note that the storage control module 15 keeps acquiring the decryption key from the key management server device 20b via the decryption key reception processing module 18 independently of the operation of the decryption processing module 19. This enables the decryption processing module 19 to decrypt the packet by using the decryption key supplied from the key management server device 20b without requesting the key management server device 20b to generate the decryption key.

The decryption processing module 19 decrypts the packet instructed from the receiving module 11. In decrypting the packet, the decryption processing module 19 extracts identification information (typically, the key identifier) of the decryption key corresponding to the encryption key used for encrypting the packet from header information or the like of the packet, and acquires the decryption key corresponding to the identification information from the storage 16 via the storage control module 15.

When the storage 16 does not have the decryption key corresponding to the encryption key (when the decryption key has not been supplied from the key management server device 20b), the storage control module 15 requests the decryption key from the key management server device 20b via the decryption key reception processing module 18. When the decryption key is inputted from the decryption key reception processing module 18, the storage control module 15 directly inputs the decryption key to the decryption processing module 19 without storing the decryption key in the storage 16. This allows the decryption key to be given to the decryption processing module 19 as quickly as possible, thereby quickly performing the decryption process.

When the decryption key for decrypting the packet has not been supplied from the key management server device 20b at the time of packet decryption, the decryption processing module 19 may wait for a predetermined time and request the storage control module 15 to read the decryption key.

When the decryption key cannot be acquired even after a predetermined number of requests for the storage control module 15 to read the decryption key, the decryption processing module 19 discards the packet without decrypting the packet. Additionally, when the decryption key for decrypting the packet has not been supplied from the key management server device 20b at the time of packet decryption, the decryption processing module 19 may wait for a notification from the storage control module 15 for a predetermined time. When receiving no notification after passage of the predetermined time, the decryption processing module 19 may discard the packet without decrypting the packet.

When acquiring the decryption key from the storage control module 15, the decryption processing module 19 decrypts the packet and inputs the decrypted packet to the forward processing module 17.

When receiving the decrypted packet from the decryption processing module 19, the forward processing module 17 forwards the packet to the external device connected to the network 103.

Figure 4:
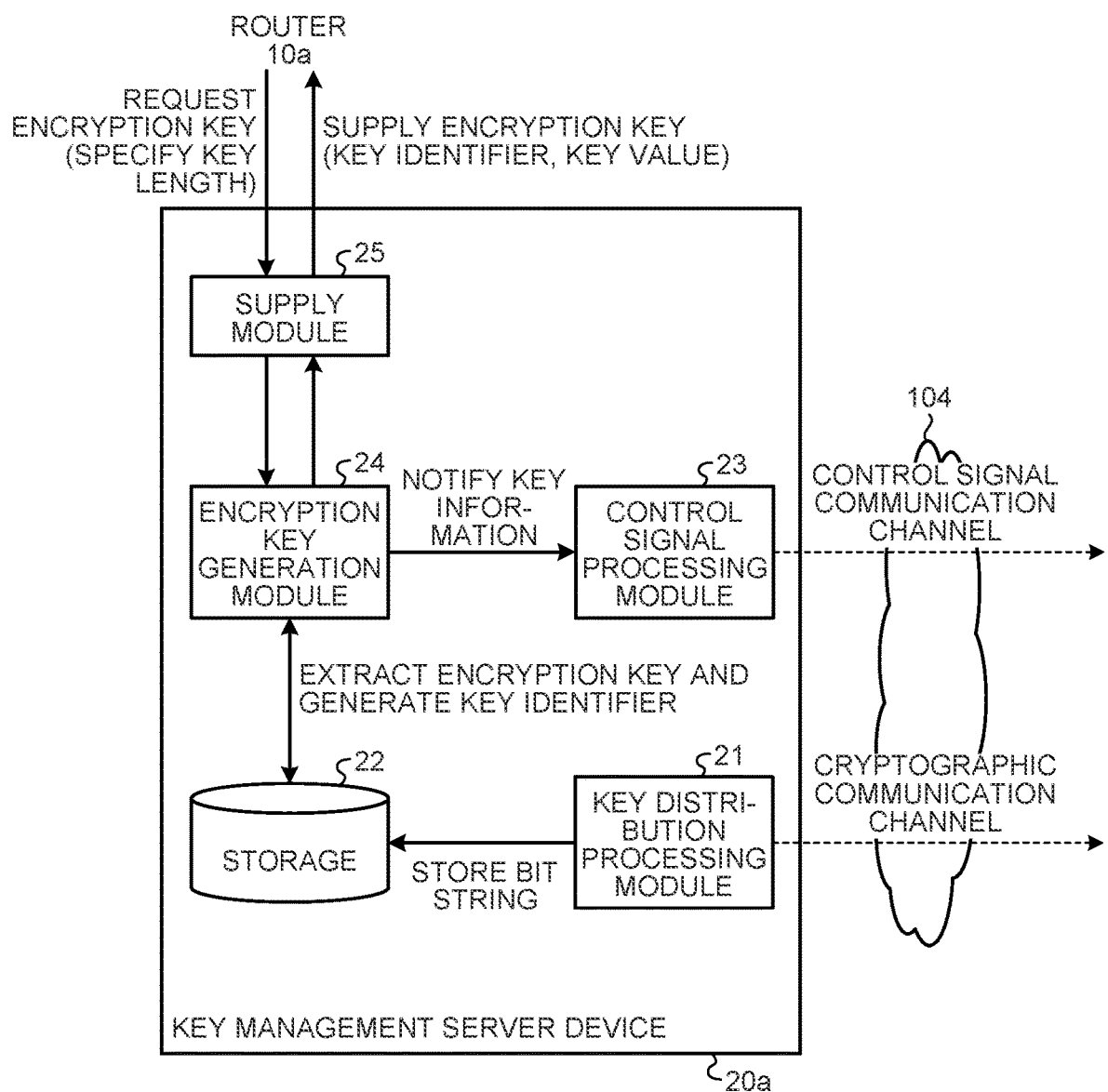
FIG. 4 is a diagram illustrating a function configuration example of a key management server device that supplies an encryption key according to the first embodiment.

Function Configuration Example of Key Management Server Device for Supplying Encryption Key FIG. 4 is a diagram illustrating a function configuration example of the key management server device 20a that supplies an encryption key according to the first embodiment. The key management server device 20a of the first embodiment includes a key distribution processing module 21, a storage 22, a control signal processing module 23, an encryption key generation module 24, and a supply module 25.

The key distribution processing module 21 shares a bit string with the key management server device 20b via the network 104 by using quantum key distribution (quantum cryptography). Note that the key distribution processing module 21 may be mounted separately from the key management server device 20a as a quantum key distribution processing device.

The storage 22 accumulates bit strings shared by the key distribution processing module 21.

The control signal processing module 23 transmits the control signal including the key information such as the identification information (typically, the key identifier), the key length, and offset information of the encryption key (the decryption key in the key management server device 20b) to the key management server device 20b that generates the decryption key, in addition to control regarding the sharing of the bit string. The offset information is information indicating where to extract the encryption key (the decryption key) from the shared bit string.

The encryption key generation module 24 generates the encryption key according to a request for the encryption key from the router 10a or autonomously. For example, the key length of the encryption key is specified by the request for the encryption key from the router 10a. Alternatively, for instance, the encryption key generation module 24 autonomously generates the encryption key having a predetermined key length. The encryption key generation module 24 extracts the encryption key having the key length from the bit string to generate the encryption key, and generates the key identifier identifying the encryption key.

The supply module 25 supplies the router 10a with the encryption key generated by the encryption key generation module 24 according to the request for the encryption key from the router 10a or autonomously. The encryption key is supplied to the router 10a using the bit string (key value) indicating the encryption key itself and the key identifier identifying the encryption key.

Figure 5:
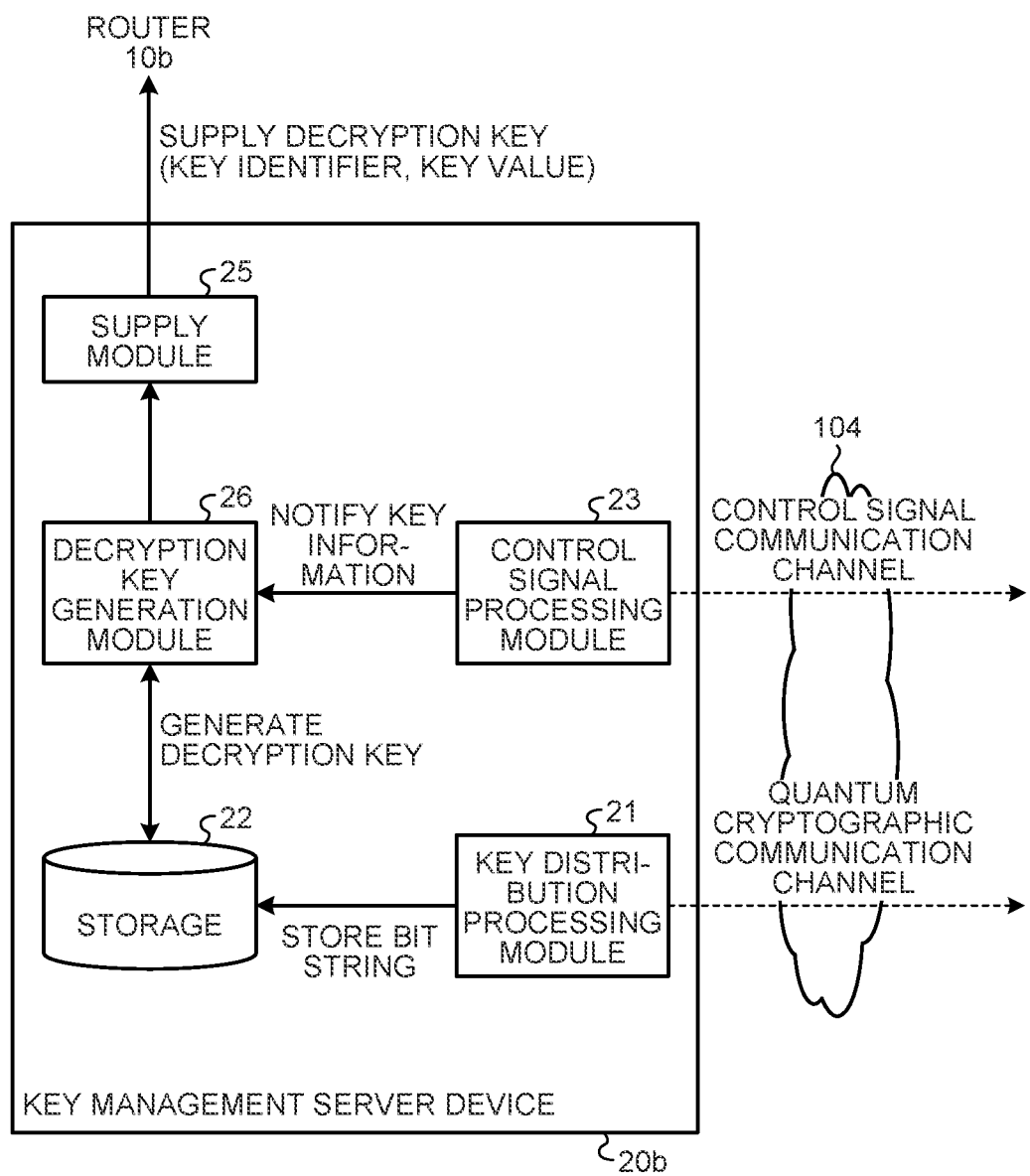
FIG. 5 is a diagram illustrating a function configuration example of a key management server device that supplies a decryption key according to the first embodiment.

Function Configuration Example of Key Management Server Device for Supplying Decryption Key FIG. 5 is a diagram illustrating a function configuration example of the key management server device 20b that supplies a decryption key according to the first embodiment. The key management server device 20b of the first embodiment includes a key distribution processing module 21, a storage 22, a control signal processing module 23, a supply module 25, and a decryption key generation module 26.

The key distribution processing module 21 shares the bit string with the key management server device 20a via the network 104 by using quantum key distribution (quantum cryptography). Note that the key distribution processing module 21 may be mounted separately from the key management server device 20b as a quantum key distribution processing device.

The storage 22 accumulates the bit strings shared by the key distribution processing module 21.

The control signal processing module 23 receives the control signal including the key information such as the identification information (typically, the key identifier), the key length, and the offset information of the decryption key (the encryption key in the key management server device 20a) from the key management server device 20a, in addition to control regarding the sharing of the bit string.

Upon receiving the control signal, the decryption key generation module 26 generates the decryption key corresponding to the encryption key from the bit string on the basis of the key identification information and the key length without waiting for a request to generate the decryption key from the router 10b. This allows the decryption key to be acquired more quickly when the router 10b decrypts the packet received from the router 10a. Consequently, the forward throughput/forward speed of the router 10b can be improved. Note that the bit position to extract the decryption key from the shared bit string is specified, for example, by the offset information included in the control signal.

The supply module 25 supplies the decryption key generated by the decryption key generation module 26 to the router 10b.

Example of Communication Method

Figure 6:
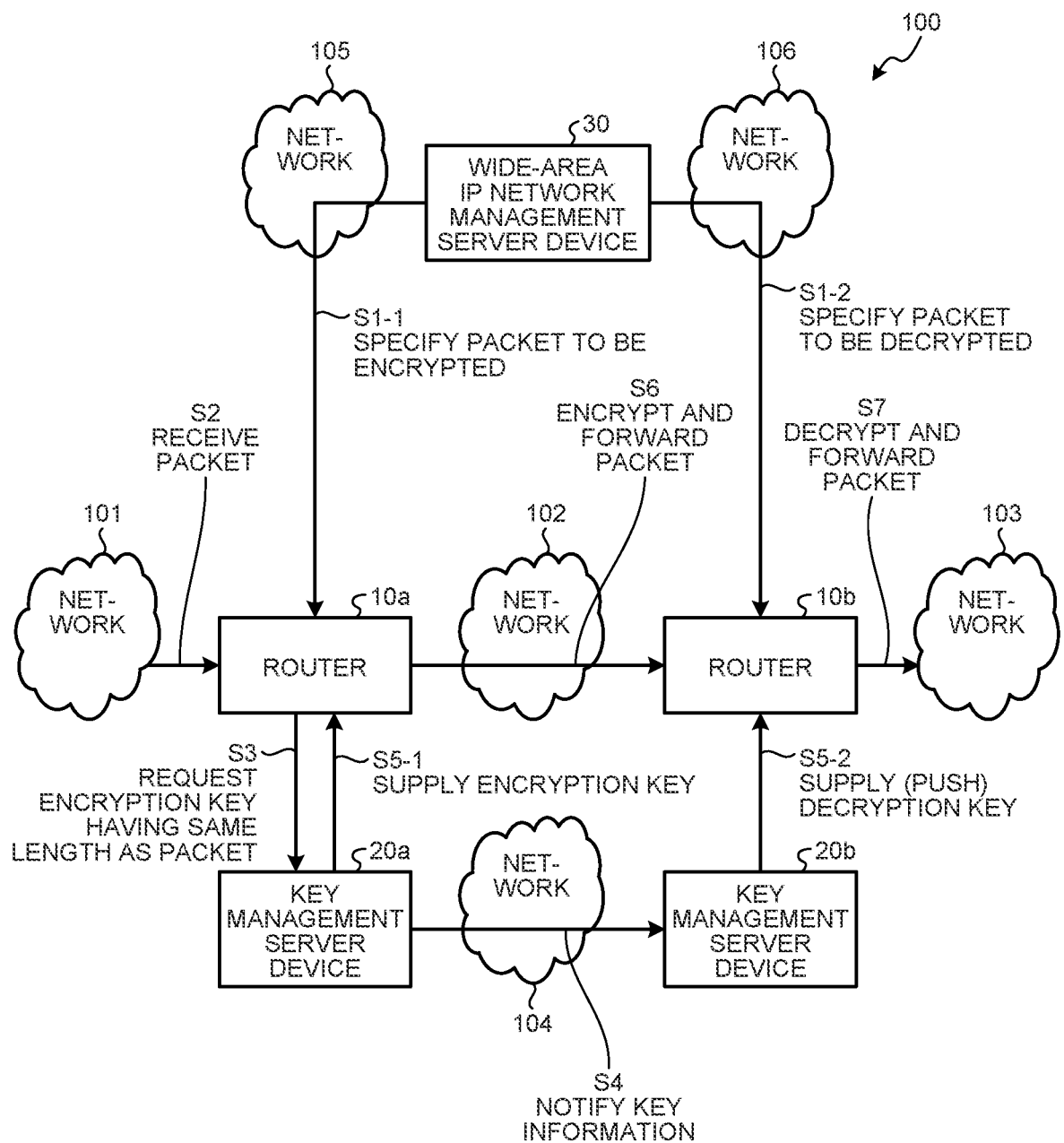
FIG. 6 is a diagram for explaining an example of a communication method according to the first embodiment.

FIG. 6 is a diagram for explaining an example of a communication method according to the first embodiment.

First, the receiving module 11 of the router 10a receives information specifying a packet to be encrypted from the wide-area IP network management server device 30 (step S1-1). Meanwhile, the receiving module 11 of the router 10b receives information specifying a packet to be decrypted from the wide-area IP network management server device 30 (step S1-2).

Subsequently, the packet reception processing module 12 of the router 10a receives a packet from the external device connected to the network 101 (step S2). The encryption processing module 13 of the router 10a then transmits a request to generate an encryption key having the same length as the packet received by the process at the step S2 to the key management server device 20a (step S3).

Subsequently, in the key management server device 20a, the encryption key generation module 24 generates the encryption key, and the control signal processing module 23 notifies the key management server device 20b of the key information (the key identification information and the key length) of the generated encryption key (step S4).

The supply module 25 of the key management server device 20a then supplies the encryption key to the router 10a (step S5-1). Meanwhile, in the key management server device 20b, the decryption key generation module 26 generates a decryption key corresponding to the encryption key supplied by the process at the step S5-1 from the bit string shared with the key management server device 20a on the basis of the key identification information and the key length notified at the step S4 without waiting for a request to generate the decryption key from the router 10b. The supply module 25 supplies (pushes) the decryption key to the router 10b (step S5-2).

Subsequently, when the packet received by the process at the step S2 is the packet specified by the process at the step S1-1, the encryption processing module 13 of the router 10a encrypts the packet by using the encryption key supplied by the process at the step S5-1, and forwards the encrypted packet to the router 10b through the network 102 (step S6). Note that a packet not specified by the process at the step S1-1 is forwarded without being encrypted at the step S6.

Subsequently, the packet reception processing module 12 of the router 10b receives the packet forwarded by the process at the step S6. When the packet forwarded by the process at the step S6 is the packet specified by the process at the step S1-2, the decryption processing module 19 decrypts the packet by using the decryption key supplied by the process at the step S5-2, and the forward processing module 17 forwards the packet to the external device connected to the network 103 (step S7). Note that a packet not specified by the process at the step S1-2 is forwarded without being decrypted at the step S7.

As described above, the communication system 100 of the first embodiment includes the wide-area IP network management server device 30, the key management server device 20a (first key management server device), the key management server device 20b (second key management server device), the router 10a (first forwarding device), and the router 10b (second forwarding device).

In the router 10a (first forwarding device), the receiving module 11 receives the information specifying the encryption target packet from the wide-area IP network management server device 30. The packet reception processing module 12 receives a first reception packet through the network 101 (first network). When the first reception packet is the encryption target packet, the encryption processing module 13 transmits the request to generate the encryption key to the first key management server device, and encrypts the first reception packet by using the encryption key supplied from the first key management server device. The forward processing module 17 (first forward processing module) forwards the encrypted first reception packet or the unencrypted first reception packet to the second forwarding device through the network 102 (second network).

In the key management server device 20a (first key management server device), the key distribution processing module 21 shares the bit string by quantum key distribution. When the wide-area IP network management server device 30 specifies the encryption target packet for the first forwarding device, the encryption key generation module 24 generates the encryption key for encrypting the encryption target packet from the bit string in response to the request to generate the encryption key transmitted from the first forwarding device. The control signal processing module 23 transmits the control signal including the key identification information for identifying the encryption key and the key length indicating the length of the encryption key to the second key management server device.

In the router 10b (second forwarding device), the packet reception processing module 12 receives a second reception packet through the second network. When the second reception packet is the decryption target packet, the decryption processing module 19 decrypts the second reception packet by using the decryption key supplied from the second key management server device without transmitting the request to generate the decryption key to the second key management server device. The forward processing module 17 (second forward processing module) forwards the decrypted second reception packet or the undecrypted second reception packet. The request to generate the decryption key is, for example, calling of Get key or Get key with key IDs of a Key Delivery API described in ETSI GS QKD 014. Alternatively, the router 10b may issue the request to generate the decryption key to the key management server device 20b on TCP, UDP, or other transport protocols. When the router 10b and the key management server device 20b share a file system and a memory, the request to generate the decryption key may be issued through interprocess communication.

In the key management server device 20b (second key management server device), the key distribution processing module 21 shares the bit string by quantum key distribution. The control signal processing module 23 receives the control signal. Upon receiving the control signal, the decryption key generation module 26 generates the decryption key corresponding to the encryption key from the bit string based on the key identification information and the key length without waiting for the request to generate the decryption key from the second forwarding device. The supply module 25 supplies the decryption key to the second forwarding device.

Consequently, the communication system 100 of the first embodiment can perform the QKD encryption and decryption without degrading the communication performance of a wide-area IP network. More specifically, the above configuration enables the router 10a (QKD compatible router) to receive control information (the information specifying the encryption target packet (flow)) from the wide-area IP network. The router 10a can thereby identify traffic to be protected by the QKD encryption key within traffic passing through the router 10a. The control information from the wide-area IP network is also transmitted to the QKD key management server devices 20a and 20b. Thus, the key management server devices 20a and 20b are adjusted such that both endpoints of communication to be protected can share a required encryption key. That is, communication over the wide-area IP network can be selectively protected by QKD. As a result, the communication to be protected can be appropriately encrypted without degrading the communication performance of the wide-area IP network even when an encryption router (VPN router) using QKD is installed at a main point in the network.

In the conventional technique, a key distribution processing speed using QKD is slower than a communication speed of the wide-area IP network. Thus, the communication performance of the wide-area IP network is degraded if the encryption router (VPN router) using QKD is installed at a main point in the network.

While the case in which the single router 10b is connected to the key management server device 20b is described in the example of FIG. 1, a plurality of the routers 10b may be connected to the key management server device 20b. When the routers 10b are connected to the key management server device 20b, the control signal further includes router identification information identifying the router 10b to be supplied with the decryption key. The router identification information includes, for example, an IP address, a port number, and a host name of each router 10. The supply module 25 supplies the decryption key to the router identified by the router identification information.

First Modification of First Embodiment

Next, a first modification of the first embodiment will be described. In the first modification, a description similar to that of the first embodiment will be omitted, and only different points from those of the first embodiment will be described.

In the first modification, a case in which the wide-area IP network management server device 30 specifies ports of the routers 10a and 10b, a VLAN tag/label of a frame for forwarding a packet (data) or the like in specifying the encryption and decryption will be described.

The wide-area IP network management server device 30 of the first modification instructs a network interface, a port or the like of the router 10*a* receiving a packet from the network 101 whether to encrypt the packet. The network interface and the port may be a physical device of the router 10*a*, or a virtual device of the router 10*a*.

The wide-area IP network management server device 30 may also instruct the router 10*a* whether to encrypt the packet by control information such as a label and a VLAN tag attached to a frame instead of the network interface and the port. More specifically, for instance, an ID field and a PCP field of a VLAN are used. For example, an existing or new Ethertype may be also used to indicate that encryption is performed. Moreover, the wide-area IP network management server device 30 may instruct the router 10*a* to encrypt some packets (flows) by using the IP address or the like as in the above first embodiment, and to encrypt other packets (flows) by using the network interface or the like. The same as the router 10*a* that performs the encryption process applies to the instruction to the router 10*b* that performs the decryption process.

Second Modification of First Embodiment

Next, a second modification of the first embodiment will be described. In the second modification, a description similar to that of the first embodiment will be omitted, and only different points from those of the first embodiment will be described.

In the second modification, a case in which a SAE ID is generated and given for each flow will be described.

When a flow to be encrypted is specified from the wide-area IP network management server device 30, the receiving module 11 of the router 10*a* of the second modification generates a SAE ID corresponding to the flow, and additionally sets the SAE ID to itself. The receiving module 11 generates a SAE ID corresponding to the flow by, for example, combining a SAE ID set to the router 10*a* itself and information identifying the flow.

For example, the receiving module 11 connects the SAE ID set to the router 10*a* itself and the information identifying the flow to generate a new SAE ID. Additionally, for instance, the receiving module 11 connects the SAE ID set to the router 10*a* itself and a hash value of the information identifying the flow to generate a new SAE ID. Moreover, for example, the receiving module 11 generates a hash value obtained from the SAE ID set to the router 10*a* itself and the information identifying the flow as a new SAE ID.

The new SAE ID corresponding to the flow may be global unique, or may be unique (local unique) only between the routers 10*a* and 10*b*. In any case, the receiving module 11 of the router 10*a* receiving the instruction from the wide-area IP network management server device 30 generates the SAE ID corresponding to the flow to be encrypted according to a certain rule. The receiving module 11 of the router 10*b* also generates a SAE ID corresponding to a flow to be decrypted in a similar method.

The SAE IDs generated by the respective receiving modules 11 may be transmitted and received, for instance, between the routers 10*a* and 10*b*, or on a control signal communication channel via the key management server devices 20. Additionally, for example, the router 10*a* may estimate the SAE ID to be newly generated by the router 10*b* from the SAE ID of the router 10*b* itself and the information identifying the flow to be decrypted by the router 10*b*. The same applies to the router 10*b*.

Second Embodiment

Next, a second embodiment will be described. In the second embodiment, a description similar to that of the first embodiment will be omitted, and only different points from those of the first embodiment will be described.

In the second embodiment, a case in which a router that receives a route change instruction is added will be described.

System Configuration Example

Figure 7:
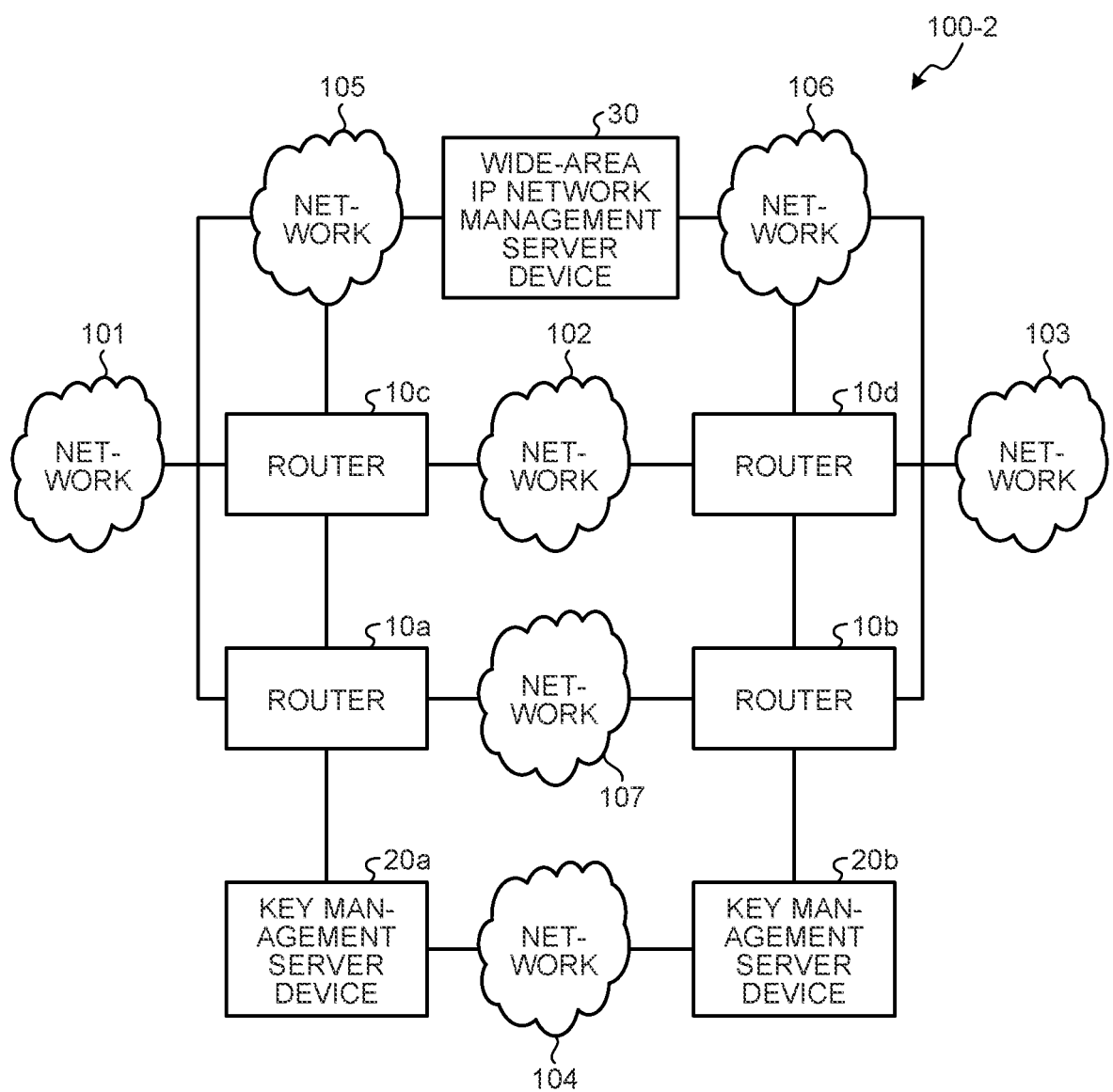
FIG. 7 is a diagram illustrating a system configuration example of a communication system according to a second embodiment.

FIG. 7 is a diagram illustrating a system configuration example of a communication system 100-2 according to the second embodiment. The communication system 100-2 of the second embodiment includes the routers 10*a* to 10*d*, the key management server devices 20*a* and 20*b*, the wide-area IP network management server device 30, and the networks 101 to 107. In the second embodiment, routers 10*c* and 10*d* and a network 107 are added to the configuration of the first embodiment. Since the routers 10*c* and 10*d* have an identical configuration, a case of the router 10*c* will be described later as an example using FIG. 8.

In the example in FIG. 7, the routers 10*a* and 10*b* are connected together via the network 107. The packet encrypted by the router 10*a* is forwarded to the router 10*b* through the network 107. The networks 102 and 107 may be an identical network or different networks. The packet encrypted by the router 10*a* may be also forwarded to the router 10*b* through the router 10*c*, the network 102, and the router 10*d* without connecting the routers 10*a* and 10*b* to the network 107.

Note that a Software Defined Networking (SDN) compatible router and a Network Service Header (NSH) defined by RFC8300 may be used as a method for achieving a route change of the second embodiment. In this case, to cause a specific packet instructed from the wide-area IP network management server device 30 to pass through the routers 10*a* and 10*b*, the receiving module 11 gives a NSH header describing a function type and an order of a service to the specific packet. The forward processing module 17 then forwards the packet specified by the NSH header to the router 10*a*. The forward processing module 17 forwards other packets (packets not instructed from the wide-area IP network management server device 30) and a packet received from the router 10*a* to the network 102.

Segment Routing (SR) may be also used as the method for achieving a route change of the second embodiment. In the SR, MPLS and IPv6, which are called SR-MPLS and SRv6, respectively, can be used as a data plane. In the SR, a received packet is instructed to execute a route change by using an identifier called SID (Segment Identifier). When MPLS is used as the data plane, the SID is stored in a label stack. Meanwhile, when IPv6 is used as the data plane, the SID is stored in a Segment List of a Segment Routing Header (SRH). When IPv6 is used as the data plane, the SID can specify a position, a function, and an argument of a network node that provides functions. When the SR is used, the receiving module 11 gives a SRH header or a MPLS label describing a processing content and an order by the SID to a specific packet instructed from the wide-area IP network management server device 30 in order to cause the specific packet to pass through the routers 10*a* and 10*b*. The forward processing module 17 forwards the packet to the router 10*a* specified by the SRH header or the MPLS label. The forward processing module 17 forwards other packets (packets not instructed from the wide-area IP network management server device 30) and a packet received from the router 10a to the network 102 according to specification in the SRH header or the MPLS label.

Function Configuration Example of Router Receiving Route Change Instruction

Figure 8:
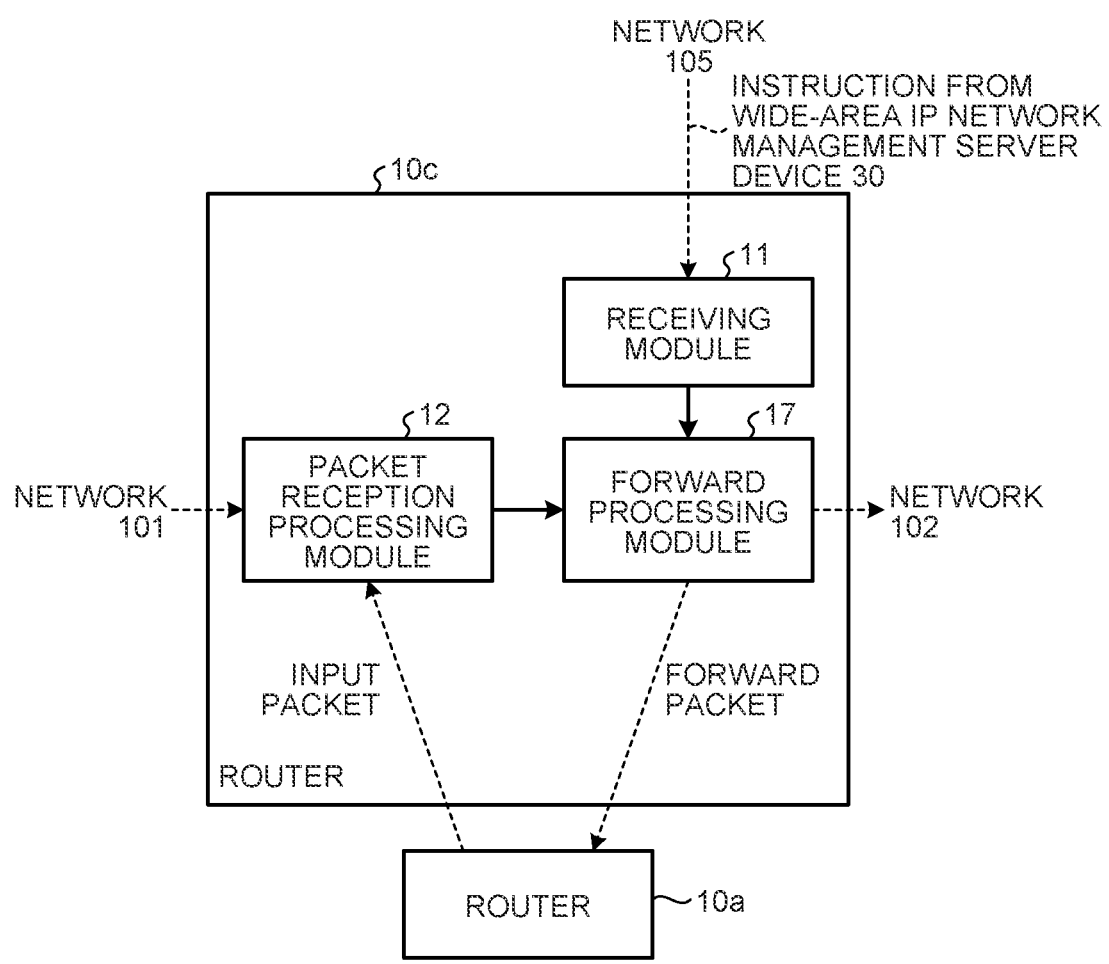
FIG. 8 is a diagram illustrating a function configuration example of a router that receives a route change instruction according to the second embodiment.

FIG. 8 is a diagram illustrating a function configuration example of the router 10c that receives a route change instruction according to the second embodiment. The router 10c of the second embodiment includes the receiving module 11, the packet reception processing module 12, and the forward processing module 17.

The receiving module 11 receives an instruction (specification) to forward a specific packet to the router 10a from the wide-area IP network management server device 30.

The forward processing module 17 forwards the specified packet to the router 10a. The forward processing module 17 forwards other packets (packets not instructed from the wide-area IP network management server device 30) and a packet received from the router 10a to the network 102.

The routers 10a and 10b may be connected to the wide-area IP network management server device 30, or do not have to be connected to the wide-area IP network management server device 30. FIG. 7 illustrates a configuration in which the routers 10a and 10b have connection with the wide-area IP network management server device 30. When the routers 10a and 10b have connection with the wide-area IP network management server device 30, the routers 10a and 10b encrypt and decrypt the packet instructed from the wide-area IP network management server device 30 in a similar manner to the first embodiment.

When the routers 10a and 10b have no connection with the wide-area IP network management server device 30, the router 10a performs encryption according to a predetermined rule, e.g., by always encrypting the received packet or encrypting only a specific packet. The same applies to the router 10b that performs decryption.

Third Embodiment

Next, a third embodiment will be described. In the third embodiment, a description similar to that of the first embodiment will be omitted, and only different points from those of the first embodiment will be described.

In the third embodiment, a case in which one or more key management server devices 20 exist between the key management server devices 20a and 20b will be described.

Figure 9:
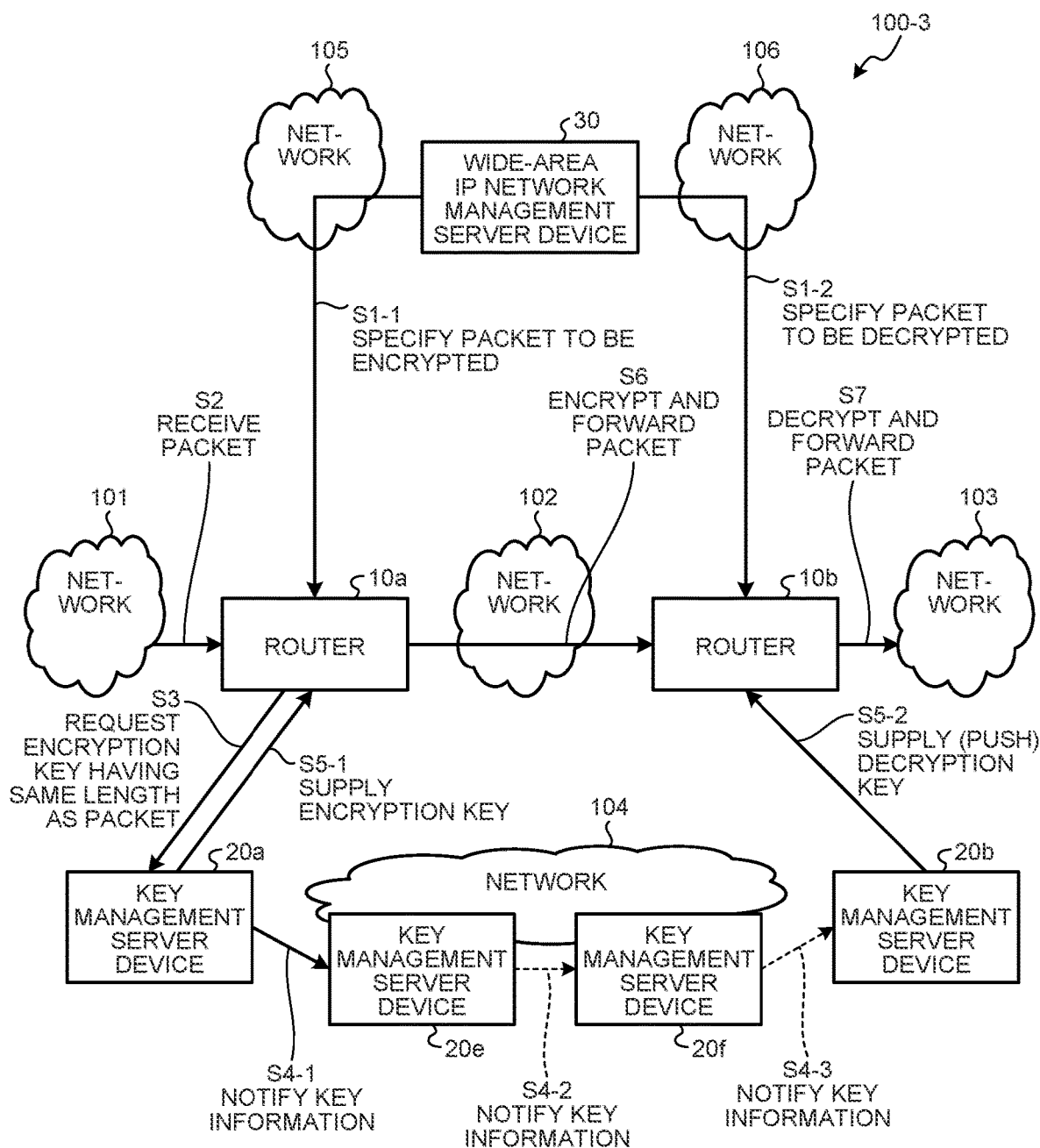
FIG. 9 is a diagram for explaining a system configuration example of a communication system and an example of a communication method according to a third embodiment.

FIG. 9 is a diagram for explaining an example of a system configuration of a communication system 100-3 and a communication method according to the third embodiment. In the example of FIG. 9, two key management server devices 20e and 20f are added between the key management server devices 20a and 20b.

In the third embodiment, the key management server device 20a shares the bit string with the key management server device 20e via a quantum cryptographic communication channel. Additionally, the key management server device 20b shares the bit string with the key management server device 20f via a quantum cryptographic communication channel. Thus, the key management server devices 20a and 20b cannot directly share the bit string in the third embodiment.

In the third embodiment, the control signal processing module 23 of the key management server device 20a protects (encrypts) the key information used for decrypting the packet in the router 10b by using the bit string shared with the adjacent key management server device 20e, and transmits the key information to the key management server device 20e. Note that the key information of the third embodiment includes not only the key identification information and the key length but also the key value used for the decryption key. The control signal processing module 23 of the key management server device 20e transmits the key information used for decrypting the packet in the router 10b to the adjacent key management server device 20f in a similar manner. As described above, the key information used for decrypting the packet forwarded by the router 10a is delivered to the key management server device 20b in a bucket brigade manner through the key management server devices 20 (step S4-1 to step S4-3).

The supply module 25 of the key management server device 20a supplies the encryption key to the router 10a (step S5-1). Meanwhile, in the key management server device 20b, the decryption key generation module 26 generates the decryption key by using the key value included in the key information notified by the process at the step S4-3 without waiting for a request to generate the decryption key from the router 10b. The supply module 25 supplies (pushes) the decryption key to the router 10b (step S5-2).

Note that a description on the steps S1-1, S1-2, S2, S3, S6 and S7, which is similar to that of the first embodiment (see FIG. 6), is omitted.

The key management server devices 20a and 20e share the bit string in advance by the key distribution processing modules 21. Thus, a portion of the bit string may be extracted and used as the key value of the decryption key used in the router 10b. That is, the key management server device 20a may newly generate the decryption key to be used in the router 10b, protect the decryption key by using the bit string shared with the key management server device 20e, and transmit the decryption key to the key management server device 20e. Alternatively, the key management server device 20a may instruct the key management server device 20e to use a portion of the bit string shared with the key management server device 20e as the key value of the decryption key used in the router 10b.

Moreover, the control signal processing module 23 of the key management server device 20a may directly transmit the key identification information and the key length shared between the key management server devices 20a and 20b to the key management server device 20b, without being relayed in a bucket brigade manner by the key management server devices 20e and 20f. Note that the key identification information and the key length may be encrypted or transmitted in clear text.

When no additional key management server device 20 exists between the key management server devices 20a and 20b, that is, even in a configuration similar to that of the first embodiment in FIG. 1, the key management server device 20a may protect (encrypt) the decryption key to be used in the router 10b by using the bit string shared with the key management server device 20b and transmit the decryption key to the key management server device 20b.

As described above, in the communication system 100-3 of the third embodiment, the key distribution processing module 21 of the key management server device 20a shares the bit string with the facing key management server device 20e by quantum key distribution. The control signal processing module 23 of the key management server device 20a encrypts the decryption key by using the shared bit string, and transmits the control signal including the encrypted decryption key and the key identification information identifying the decryption key to the facing key management server device 20e.

Similarly, the key distribution processing module 21 of the key management server device 20e shares the bit string with the facing key management server device 20f by quantum key distribution. The control signal processing module 23 of the key management server device 20e encrypts the decryption key (the decryption key received from the key management server device 20a) by using the shared bit string, and transmits the control signal including the encrypted decryption key and the key identification information identifying the decryption key to the facing key management server device 20f.

Similarly, the key distribution processing module 21 of the key management server device 20f shares the bit string with the facing key management server device 20b by quantum key distribution. The control signal processing module 23 of the key management server device 20f encrypts the decryption key (the decryption key received from the key management server device 20e) by using the shared bit string, and transmits the control signal including the encrypted decryption key and the key identification information identifying the decryption key to the facing key management server device 20b.

Upon receiving the control signal from the key management server device 20f, the supply module 25 of the key management server device 20b supplies the decryption key to the router 10b without waiting for the request to generate the decryption key from the router 10b.

Meanwhile, in the router 10b, the packet reception processing module 12 receives the packet encrypted with the encryption key corresponding to the decryption key identified by the key identification information. The decryption processing module 19 decrypts the packet by using the decryption key supplied from the key management server device 20b without requesting the key management server device 20b to generate the decryption key.

Consequently, the communication system 100-3 of the third embodiment can provide similar effects to those of the first embodiment even when the bit string cannot be directly shared between the key management server devices 20a and 20b. Additionally, the communication system 100-3 of the third embodiment enables the decryption key for decrypting the encrypted packet to be acquired from the key management server device 20b without receiving the encrypted packet.

Fourth Embodiment

Next, a fourth embodiment will be described. In the fourth embodiment, a description similar to that of the first embodiment will be omitted, and only different points from those of the first embodiment will be described.

In the fourth embodiment, a case in which the wide-area IP network management server device 30 is connected to the router 10a and is not connected to the router 10b will be described.

System Configuration Example

Figure 10:
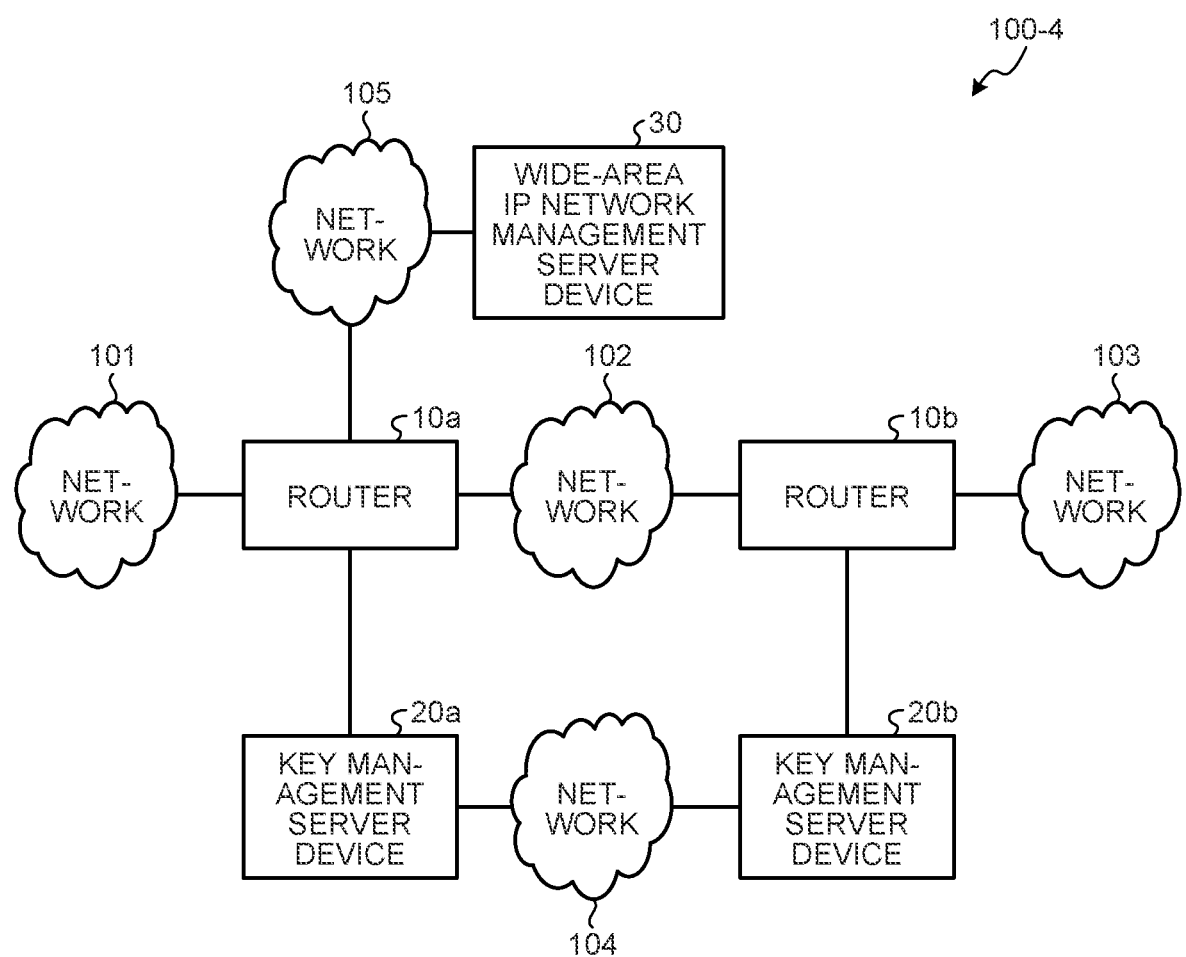
FIG. 10 is a diagram illustrating a system configuration example of a communication system according to a fourth embodiment.

FIG. 10 is a diagram illustrating a system configuration example of a communication system 100-4 according to the fourth embodiment. The communication system 100-4 of the fourth embodiment includes the routers 10a and 10b, the key management server devices 20a and 20b, the wide-area IP network management server device 30, and the networks 101 to 105. In the fourth embodiment, the network 106 between the wide-area IP network management server device 30 and the router 10b is deleted from the configuration of the first embodiment.

Function Configuration Example of Packet Decrypting Router

Figure 11:
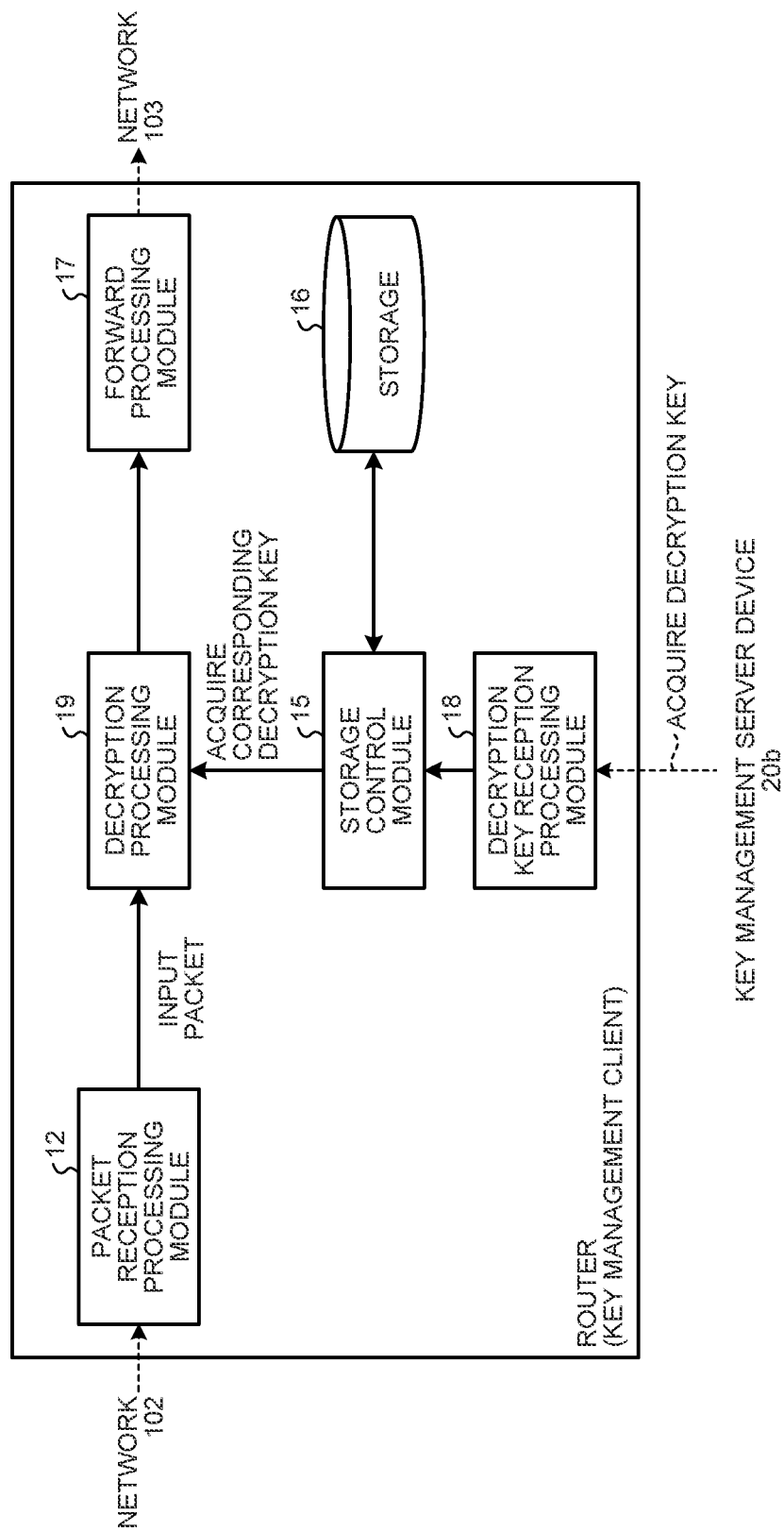
FIG. 11 is a diagram illustrating a function configuration example of a router that decrypts a packet according to the fourth embodiment.

FIG. 11 is a diagram illustrating a function configuration example of the router 10b that decrypts a packet according to the fourth embodiment. The router 10b of the fourth embodiment includes the packet reception processing module 12, the storage control module 15, the storage 16, the forward processing module 17, the decryption key reception processing module 18, and the decryption processing module 19. In the fourth embodiment, the router 10b does not include the receiving module 11. Unlike in the first embodiment, the decryption processing module 19 determines whether the received packet is encrypted from a header or the like of the packet. When the packet is encrypted, the decryption processing module 19 acquires the decryption key and performs the decryption process in a similar manner to the first embodiment. Other operations of the router 10b are similar to those of the first embodiment.

Lastly, hardware configuration examples of the router 10 and the key management server device 20 of the first to fourth embodiments will be described.

Hardware Configuration Example

Figure 12:
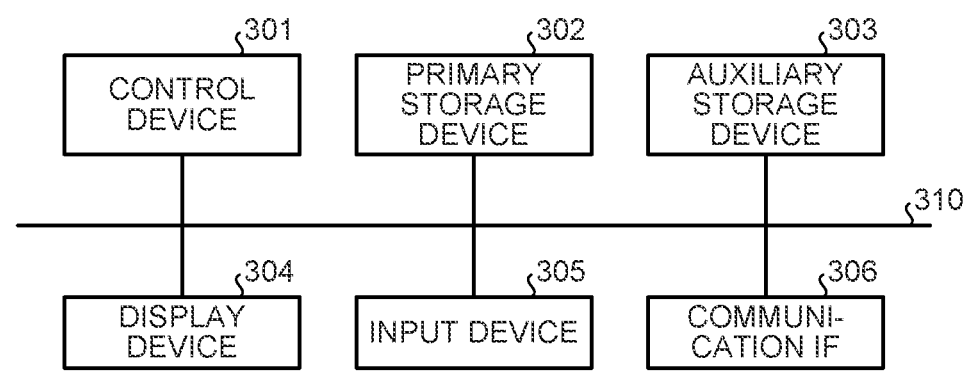
FIG. 12 is a diagram illustrating a hardware configuration example of the router according to the first to fourth embodiments.

FIG. 12 is a diagram illustrating a hardware configuration example of the router 10 according to the first to fourth embodiments. The router 10 includes a control device 301, a primary storage device 302, an auxiliary storage device 303, a display device 304, an input device 305, and a communication interface (IF) 306.

The control device 301, the primary storage device 302, the auxiliary storage device 303, the display device 304, the input device 305, and the communication IF 306 are connected together via a bus 310.

The control device 301 executes a computer program read into the primary storage device 302 from the auxiliary storage device 303. The primary storage device 302 is a memory such as a read only memory (ROM) and a random access memory (RAM). The auxiliary storage device 303 is, for example, a hard disk drive (HDD) or a memory card.

The display device 304 displays a state or the like of the router 10. The input device 305 receives an input from a user. The communication IF 306 is an interface to be connected to the networks 101 to 103 and 105 to 107 and the key management server device 20. Note that the router 10 does not have to include the display device 304 and the input device 305. When the router 10 does not include the display device 304 and the input device 305, for example, a display function and an input function of an external terminal connected via the communication IF 306 may be used.

Figure 13:
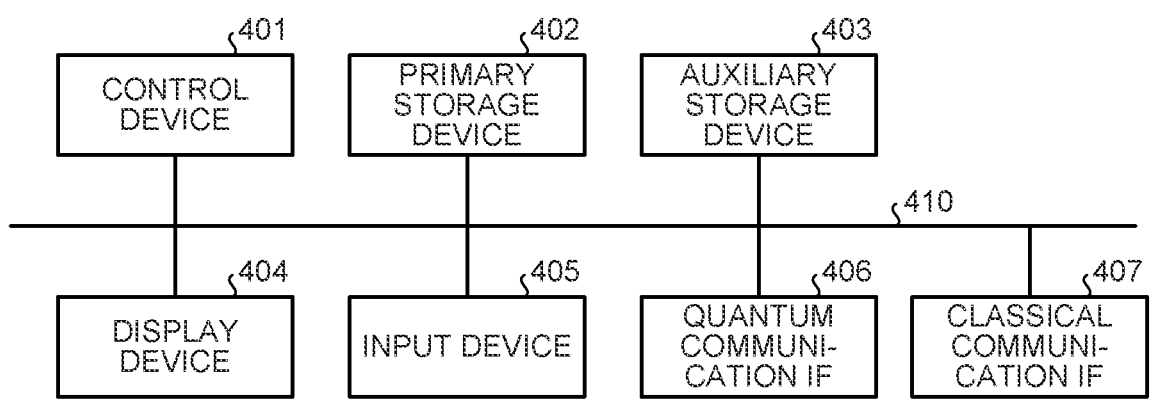
FIG. 13 is a diagram illustrating a hardware configuration example of the key management sever device according to the first to fourth embodiments.

FIG. 13 is a diagram illustrating a hardware configuration example of the key management server device 20 according to the first to fourth embodiments. The key management server device 20 of the first to fourth embodiments includes a control device 401, a primary storage device 402, an auxiliary storage device 403, a display device 404, an input device 405, a quantum communication IF 406, and a classical communication IF 407.

The control device 401, the primary storage device 402, the auxiliary storage device 403, the display device 404, the input device 405, the quantum communication IF 406, and the classical communication IF 407 are connected together via a bus 410.

The control device 401 executes a computer program read into the primary storage device 402 from the auxiliary storage device 403. The primary storage device 402 is a memory such as a ROM and a RAM. The auxiliary storage device 403 is, for example, an HDD or a memory card.

The display device 404 displays a state or the like of the key management server device 20. The input device 405 receives an input from a user. Note that the key management server device 20 does not have to include the display device 404 and the input device 405.

The quantum communication IF 406 is an interface to be connected to a quantum cryptographic communication channel (the network 104). The classical communication IF 407 is an interface to be connected to a control signal communication channel and the router 10.

The computer program executed by the router 10 and the key management server device 20 of the first to fourth embodiments is provided as a computer program product by being recorded in a computer-readable storage medium such as a CD-ROM, a memory card, a CD-R, and a digital versatile disc (DVD) in the form of an installable or executable file.

The computer program executed by the router 10 and the key management server device 20 of the first to fourth embodiments may also be stored in a computer connected to a network such as the Internet and may be provided by being downloaded via the network.

The computer program executed by the router 10 and the key management server device 20 of the first to fourth embodiments may also be provided via a network such as the Internet without being downloaded.

The computer program executed by the router 10 and the key management server device 20 of the first to fourth embodiments may also be provided by being previously incorporated in a ROM or the like.

The computer program executed by the router 10 of the first to fourth embodiments is configured by a module including a function achievable by the computer program within the function configuration of the router 10 of the first to fourth embodiments. The control device 301 reads and executes the computer program from a storage medium such as the auxiliary storage device 303 such that the function achieved by the computer program is loaded in the primary storage device 302. That is, the function achieved by the computer program is generated on the primary storage device 302.

Additionally, the computer program executed by the key management server device 20 of the first to fourth embodiments is configured by a module including a function achievable by the computer program within the function configuration of the key management server device 20 of the first and second embodiments. The control device 401 reads and executes the computer program from a storage medium such as the auxiliary storage device 403 such that the function achieved by the computer program is loaded in the primary storage device 402. That is, the function achieved by the computer program is generated on the primary storage device 402.

Note that the functions of the router 10 and the key management server device 20 of the first to fourth embodiments may be partially or wholly achieved by hardware such as an integrated circuit (IC). The IC is, for example, a processing module that executes dedicated processing.

Moreover, when a plurality of processors are used to achieve the functions, each processor may achieve one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above router 10 may be a switch that forwards frames (packets) at L2 layer. That is, the above embodiments can be applied to a forwarding device such as a router, a switch, and a gateway.

Additionally, for instance, packets may be encrypted and decrypted partially, not entirely. Preferably, the uppermost layer protocol is encrypted partially other than a specified condition or entirely, out of protocols instructed to be encrypted or decrypted. For example, a data portion (payload portion) of the uppermost layer protocol may be encrypted or decrypted. For instance, when encryption and decryption are performed on a flow forwarded over IPv4 and having UDP destination port No. 1234, a UDP data portion (payload portion) excluding a UDP header may be encrypted and decrypted. If the entire packet is encrypted, a problem occurs in forwarding the packet, or it becomes difficult to specify a decryption target under the same conditions on the decryption side. These problems can be solved by encrypting only the data portion.

Moreover, for example, the wide-area IP network management server device 30 may specify a portion to be encrypted or decrypted. For instance, the wide-area IP network management server device 30 may notify the router 10 of an encryption target portion (decryption target portion) including a start position and an end position to perform encryption or decryption in a packet, together with encryption/decryption conditions for each flow. The start position and the end position may be notified, for example, using the number of bytes (the number of octets) of the offset from the start of the packet. The router 10 encrypts or decrypts the specified portion of the packet based on such an instruction. Additionally, the encryption target portion (decryption target portion) may be transmitted by being embedded in a frame header or data. Moreover, conversely, a portion not to be encrypted (portion not to be decrypted), not the encryption target portion (decryption target portion), may be transmitted.

Additionally, for instance, the encryption processing module 13 of the router 10a (the decryption processing module 19 of the router 10b) recalculates an Ethernet checksum since data is changed by encryption (decryption). If the checksums of IPv4, UDP, TCP, and other protocols are changed, the checksums may be recalculated and provided.

What is claimed is:

1. A communication system comprising:
a wide-area IP network management server device;
a first key management server device;
a second key management server device;
a first forwarding device; and
a second forwarding device,
the first forwarding device comprising:
  a first memory; and
  one or more first processors coupled to the first memory and configured to:
    receive information specifying an encryption target packet from the wide-area IP network management server device;
    receive a first reception packet through a first network;
    determine, based on the information specifying the encryption target packet, whether the first reception packet is the encryption target packet;

transmit a request to generate an encryption key to the first key management server device and to encrypt the first reception packet by using the encryption key supplied from the first key management server device when the first reception packet is the encryption target packet, and not transmit the request to generate the encryption key to the first key management server device when the first reception packet is not the encryption target packet; and forward the encrypted first reception packet or the unencrypted first reception packet to the second forwarding device through a second network, the first key management server device comprising:
a second memory; and
one or more second processors coupled to the second memory and configured to:
share a bit string by quantum key distribution;
determine whether the wide-area IP network management server device specifies the encryption target packet for the first forwarding device based on the request transmitted from the first forwarding device receiving information specifying the encryption target packet from the wide-area IP network management server device, and generate the encryption key for encrypting the encryption target packet from the bit string in response to the request transmitted from the first forwarding device when the encryption target packet is specified for the first forwarding device; and
transmit a control signal including key identification information identifying the encryption key and a key length indicating a length of the encryption key to the second key management server device, the second forwarding device comprising:
a third memory; and
one or more third processors coupled to the third memory and configured to:
receive information specifying a decryption target packet from the wide-area IP network management server device;
receive a decryption key supplied from the second key management server device that generates the decryption key by using quantum key distribution, without transmitting a request to generate the decryption key to the second key management server device;
store the decryption key in the third memory;
receive a second reception packet through the second network;
determine whether the second reception packet is the decryption target packet specified from the wide-area IP network management server device;
decrypt the second reception packet by using the decryption key in the third memory when the second reception packet is the decryption target packet, and not decrypt the second reception packet when the second reception packet is not the decryption target packet; and
forward the decrypted second reception packet or the undecrypted second reception packet, the second key management server device comprising:
a fourth memory; and
one or more fourth processors coupled to the fourth memory and configured to:
share the bit string by quantum key distribution;
receive the control signal;
generate the decryption key corresponding to the encryption key from the bit string based on the key identification information and the key length, upon receiving the control signal without waiting for a request to generate the decryption key from the second forwarding device; and
supply the decryption key to the second forwarding device.

* * * * *